United States Patent
Park

(10) Patent No.: US 9,411,327 B2
(45) Date of Patent: Aug. 9, 2016

(54) SYSTEMS AND METHODS FOR CLASSIFYING DATA IN BUILDING AUTOMATION SYSTEMS

(75) Inventor: Youngchoon Park, Brookfield, WI (US)

(73) Assignee: Johnson Controls Technology Company, Plymouth, MI (US)

(*) Notice: Subject to any disclaimer, the term of this patent is extended or adjusted under 35 U.S.C. 154(b) by 667 days.

(21) Appl. No.: 13/595,945

(22) Filed: Aug. 27, 2012

(65) Prior Publication Data

US 2014/0058539 A1 Feb. 27, 2014

(51) Int. Cl.
*G05B 13/02* (2006.01)
*G05B 15/02* (2006.01)

(52) U.S. Cl.
CPC ...... *G05B 15/02* (2013.01); *G05B 2219/21088* (2013.01); *G05B 2219/25011* (2013.01)

(58) Field of Classification Search
CPC .................................................. G05B 13/02
USPC ........................ 700/50; 707/769, 741; 709/206
See application file for complete search history.

(56) References Cited

U.S. PATENT DOCUMENTS

| | | | |
|---|---|---|---|
| 5,301,109 A | 4/1994 | Landauer et al. | |
| 2006/0095521 A1* | 5/2006 | Patinkin | 709/206 |
| 2006/0184479 A1 | 8/2006 | Levine | |
| 2011/0087650 A1 | 4/2011 | Mackay et al. | |
| 2011/0087988 A1 | 4/2011 | Ray et al. | |
| 2011/0088000 A1 | 4/2011 | Mackay | |
| 2011/0137853 A1 | 6/2011 | Mackay | |
| 2012/0011126 A1* | 1/2012 | Park et al. | 707/741 |
| 2012/0011141 A1* | 1/2012 | Park et al. | 707/769 |
| 2012/0022698 A1 | 1/2012 | Mackay | |

* cited by examiner

*Primary Examiner* — Tejal Gami

(74) *Attorney, Agent, or Firm* — Foley & Lardner LLP

(57) ABSTRACT

A computerized method of assigning a building automation system point type to a plurality of unclassified data points is provided. The method includes receiving unclassified data points and attributes for each data point. The method includes receiving classifications for a first subset of the unclassified data points. Each classification associates a data point with a building automation system point type. The method includes generating a term set containing substrings that appear in the attributes. The method includes generating a first matrix describing a frequency that the substrings appear in the attributes. The method includes calculating an indicator of a probability that the presence of the selected substring results in the data point belonging to the selected point type. The method includes assigning a point type to a second subset by finding the substring and potential point type pair having the greatest indication of probability.

20 Claims, 5 Drawing Sheets

SYSTEMS AND METHODS FOR CLASSIFYING DATA IN BUILDING AUTOMATION SYSTEMS

BACKGROUND

The present disclosure generally relates to the field of building automation systems. The present invention more particularly relates to systems and methods for classifying data points within a multi-point network based on processing the non-standard and semantically rich descriptions of the points.

Advanced building management system applications sometimes rely on the classification and identification of points. Conventional building management system commissioning processes rely heavily on manual point classification methods. In other words, a user manually evaluates an existing point and manually classifies the point under the schema or protocol for the new application.

Building automation systems are, in general, hardware and/or software systems configured to control, monitor, and manage devices in or around a building or building area. BAS subsystems or devices can include heating, ventilation, and air conditioning (HVAC) subsystems or devices, security subsystems or devices, lighting subsystems or devices, fire alerting subsystems or devices, elevator subsystems or devices, or other devices that are capable of automating or managing building functions, or any combination thereof.

Building automation communication standards such as BACnet and oBIX provide mechanisms to uniquely identify a data item or point within a domain of interest (e.g., within a system or a controller). The standards also allow description of the function of a data point. However, the standards are designed for human operators, not for machine processing. The human operators often decide upon a naming convention that roughly describes the location, type, or other attributes of the point. For example, a human operator might decide to name a power meter located at building C1, Floor 3, East as "BLDG-C1/ZONE/F-3/EAST/UTILS/EMETER/PWR-3," where forward slash is used as a delimiter. Despite good intentions, point names are often non-standard and difficult to parse. If the goal is assigning a discovered point to a rich functional description that an application can understand and process, the commissioning process can be very lengthy for buildings having many points. For example, given 50,000 discovered points and a conservatively quick one minute per point to review, classify, and commission, over eight hundred hours of manual investigation may be necessary to configure building points such that they will be useful to an application that relies on accurate functional classification and mapping. Because not all points are necessary for an application, points that are relevant to an application must be selected. This is also accomplished through manual investigation of naming conventions, when such conventions exist. Relevant points must be mapped into the specific equipment. For example, HVAC equipment generally comprises a set of points. Temperature sensors, cooling/heating set points, humidity, discharge air temperature, and other points, for example, may be associated with a single variable air volume (VAV) box. Conventionally, spatial relationships among points, equipments and building spaces must be manually identified and mapped.

Current building automation system naming standards lack the expressive power to (1) assign a computable semantic type description to a specific point, and (2) create a relationship among building related objects (e.g., temperature sensor, fan speed, electricity consumption, zone, equipment, etc.). Even though BACnet provides an object identifier, an object name, and an object type as mandatory attributes (e.g., character strings) to describe a point, there is no extension to describe the function of the point as an object type and to define relationships among multiple BACnet objects. Human interpretation of attributes is required to identify the function of the point for further programming or application binding. Often additional programming and nonstandard metadata management are used to support new building automation system applications.

The challenges already discussed are increased by the reality that enterprise class building automation systems are often the collection of heterogeneous building automation subsystems and devices. Furthermore, over time different building engineers may add-to or otherwise modify the system. For example, to describe outdoor air temperature, one operator may use "OAT," while another uses "Outdoor Temperature." It is also possible for multiple languages (e.g., English and Spanish) to variously be used in naming and describing a single system configuration. The uniqueness of each language makes word extraction or word segmentation extremely challenging. For example, Chinese and Japanese do not have white space to delimit characters at word boundaries. Many European languages, e.g., German, permit free form word jointing to make compound words. There are many abbreviations to shorten the description of points, and there are many variations for each abbreviation. For example, to describe zone temperature, "ZT," "ZN-T," "ZNT," and others may be used. An organization may use custom coding technology to encode data points. Such systems may be lookup based, such that a point is assigned a unique identifier, e.g., 01V001AI01.

For at least the reasons noted above, it is challenging and difficult to develop systems and methods for classifying data in building automation systems.

SUMMARY

One embodiment of the invention relates to a computerized method of assigning a building automation system point type to a plurality of unclassified data points of a building automation system. The method includes receiving, at a processing circuit, the plurality of unclassified data points and at least one attribute for each data point. The method includes receiving classifications for a first subset of the unclassified data points. Each classification associates a data point with a building automation system point type. The remaining unclassified data points form a second subset. The method includes generating a term set containing substrings that appear in the attributes of the first subset of data points. The method includes generating a first matrix describing a frequency that each of the substrings appears in the at least one attribute of the data points of the first subset. The method includes, for each of a plurality of potential building automation system point types and for each of a plurality of different substrings, calculating an indicator of a probability that the presence of the selected substring in the at least one attribute of a data point results in the data point belonging to the selected building automation system point type. The method includes assigning a building automation system point type to each data point of the second subset by finding the substring and potential building automation system point type pair having the greatest indication of probability.

Another embodiment of the invention relates to a system for assigning a building automation system point type to a plurality of unclassified data points of a building automation system. The system includes a processing circuit configured to receive the plurality of unclassified data points and at least one attribute for each data point. The processing circuit is further configured to receive classifications for a first subset of the unclassified data points. Each classification associates a data point with a building automation system point type. The remaining unclassified data points form a second subset. The processing circuit is further configured to generate a term set containing substrings that appear in the attributes of the first subset of data points. The processing circuit is further configured to generate a first matrix describing a frequency that each of the substrings appears in the at least one attribute of the data points of the first subset. The processing circuit is further configured, for each of a plurality of potential building automation system point types and for each of a plurality of different substrings, to calculate an indicator of a probability that the presence of the selected substring in the at least one attribute of a data point results in the data point belonging to the selected building automation system point type. The processing circuit is further configured to assign a building automation system point type to each data point of the second subset by finding the substring and potential building automation system point type pair having the greatest indication of probability.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DESCRIPTION

Before turning to the figures, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Referring generally to the Figures, a computer system for automatically classifying data points in a building automation system (BMS) is shown and described. The computer system may be utilized in conjunction with a plurality of building automation or management systems, subsystems, or as a part high level building automation system. For example, the computer system may be a part of a Johnson Controls METASYS building automation system.

The computer system includes a processing circuit configured to probabilistically classify points through frequency weighting of relevant terms used in point descriptions. The processing circuit is also configured to provide a graphical user interface for allowing a building operator to view, sort, and/or edit point descriptions and BMS point types.

Embodiments of the present disclosure are configured to automatically (e.g., via a computerized process) calculate the frequency that relevant terms appear in point descriptions belonging to the same BMS point type. The frequencies may be weighted, e.g., to account for the appearance of common descriptors (e.g., "Metasys") across all or substantially all data points. A matrix describing the frequencies can be generated. The matrix may be generated using a subset (e.g., training data) of the full dataset to be classified. From the frequency matrix, a representation of the probability that the presence of a substring in a point description attribute indicates that the point belongs to a given point type may be generated. A naive Bayes classifier, latent semantic indexing, or other classification methods, can be used to assign point types to data points in the entire dataset.

One or more embodiments described herein advantageously assign BMS point types to data points with names or descriptions that include a large number of abbreviations, non-dictionary words, and incomplete sentences. One or more embodiments also advantageously assign point types without general word-breaking rules and/or lexical analysis algorithms. One or more of the embodiments also advantageously avoid the need for new or different word-breaking rules and/or lexical analysis algorithms when additional data points (e.g., additional BAS installations or subsystems) are added to the system. One or more of the embodiments also advantageously assign point types based on terms in the point descriptions without a complete keyword dictionary or a parser that must be updated each time new data points are added to the system.

Figure 1:
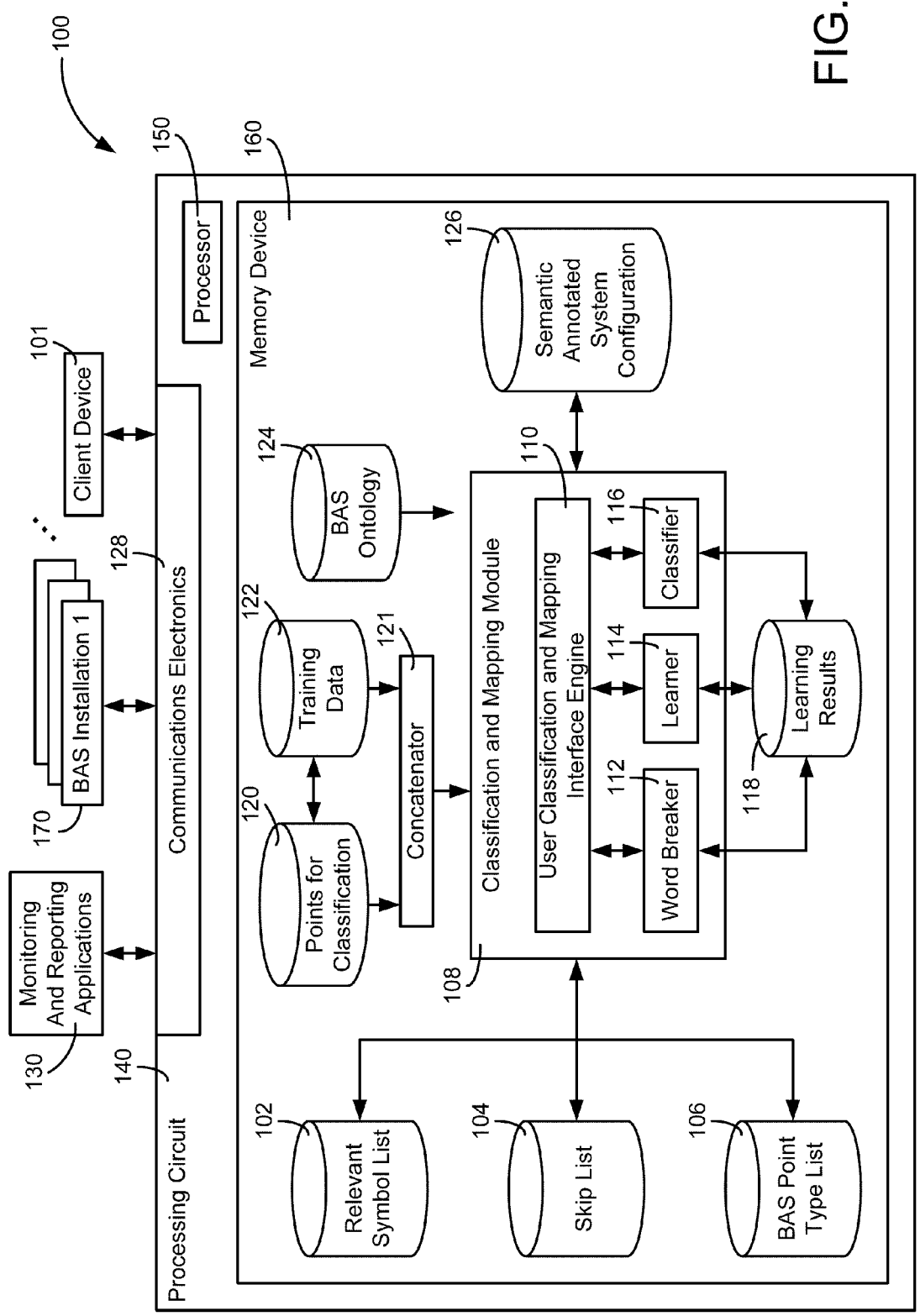
FIG. 1 is a block diagram of a system for classifying data points in a building management system, according to an exemplary embodiment.

Referring now to FIG. 1, a block diagram of system 100 for classifying data points in a building automation system is shown, according to an exemplary embodiment. System 100 includes a processing circuit 140. Processing circuit 140 may be configured to carry out process 400 (FIG. 4), process 500 (FIG. 5), process 600 (FIG. 6), process 700 (FIG. 7), or other processes described herein.

System 100 also includes BAS installations 170. BAS installations 170 are, in general, hardware and/or software systems configured to control, monitor, and manage devices in or around a building or building area. Subsystems or devices of BAS installations 170 can include heating, ventilation, and air conditioning (HVAC) subsystems or devices, security subsystems or devices, lighting subsystems or devices, fire alerting subsystems or devices, elevator subsystems or devices, other devices that are capable of managing building functions, or any combination thereof. Many data points may be associated with each subsystem and device of BAS installations 170. For example, a return air temperature data point may be associated with a HVAC subsystem's return air temperature sensor. Data points are named or otherwise described with attributes or metadata in BAS installations 170. A point description may include, e.g., an object identifier, object name, description, device type, units, or other attributes. BAS installations 170 may have many of a particular point type. For example, in a building with more than one floor, many temperatures sensors may exist per floor.

Processing circuit 140 is configured to include communications electronics 128. Communications electronics 128 may be a network interface, and processing circuit 140 may be configured to communicate with BAS installations 170 via a network connection provided by communications electronics 128. For example, point descriptions from BAS installations 170 may be received at processing circuit 140 via communications electronics 128. Communications electronics 128 may be used to communicate with monitoring and reporting applications 130 and/or with client device 101. For example, point descriptions and BMS point types may be provided to and edited point descriptions and BMS points types may be received from monitoring and reporting applications 130 and/or client device 101 via communications electronics 128. Communications electronics 128 can be or include wired or wireless interfaces (e.g., jacks, antennas, transmitters, receivers, transceivers, wire terminals, etc.) for conducting data communications with another system or network. For example, communications electronics 128 can include an Ethernet card and port for sending and receiving data via an Ethernet-based communications network. In another example, communications electronics 128 includes a WiFi transceiver for communicating via a wireless communications network. Communications electronics 128 may be configured to communicate via local area networks or wide area networks (e.g., the Internet, a building WAN, etc.).

According to an exemplary embodiment, processing circuit 140 is integrated within a single computer (e.g., one server, one housing, etc.). In various other exemplary embodiments, processing circuit 140 can be distributed across multiple servers or computers (e.g., that can exist in distributed locations). In another exemplary embodiment, processing circuit 140 may integrated with a smart building manager that manages multiple building systems. In other embodiments, processing circuit 140 may exist relatively independently of other building automation system. Processing circuit 140 may be configured to receive and operate on data received from one or more building automation system installations 170. The installations 170 themselves may be remote from one another and remote from processing circuit 140.

Processing circuit 140 includes processor 150 and memory 160. Processor 150 can be implemented as a general purpose processor, an application specific integrated circuit (ASIC), one or more field programmable gate arrays (FPGAs), a group of processing components, or other suitable electronic processing components. Memory 160 is one or more devices (e.g., RAM, ROM, Flash memory, hard disk storage, etc.) for storing data and/or computer code for completing and/or facilitating the various processes and modules described in the present disclosure. Memory 160 may be or include volatile memory or non-volatile memory. Memory 160 may include database components, object code components, script components, or any other type of information structure for supporting the various activities and information structures described in the present disclosure. According to an exemplary embodiment, memory 160 is communicably connected to processor 150 via processing circuit 140 and includes computer code for executing (e.g., by processing circuit 140 and/or processor 150) one or more processes described herein.

Memory 160 is shown to include one exemplary embodiment of the system architecture for the point commissioning process described herein. Memory 160 is shown to include points for classification 120. Points for classification 120 include point objects and/or point descriptors received from BAS installations 170.

Point objects are collections of attribute values. In the discussion herein, "data point," "point," and "point object" are used interchangeably. In a dataset, the ith point $p_i$ is a set of attribute values $a_{(i,j)}$, denoted by $p_i = \{a_{(i,1)}, \ldots, a_{(i,n)}\}$. $a_{(i,j)}$ represents the jth attribute of the ith point in a dataset. For example, a set of attributes for a BACnet analog object may include object identifier, object name, description, device type, or other attributes. A BACnet point for a return air temperature sensor, e.g., may have the following attributes (shown with example values for illustrative purposes):

| Attribute Type | Value |
| --- | --- |
| Object Identifier | Analog Input #1101 |
| Object Name | 507_SP2.RET_AIR |
| Object Type | Analog Input |
| Present Value | 68 |
| Description | Return Air Temperature |
| Device Type | Thermistor |
| Status Flags | In_Alarm, Fault |
| Units | DOF |
| . | . |
| . | . |
| . | . |

For further processing by processing circuit 100, concatenator 121 can create a point descriptor for each point to be classified. The resulting point descriptor is an n-gram (i.e., a continuous sequence of the attributes) in the form of a concatenated string of the attribute values of the point. The point descriptor $d_i$ of the ith point object $p_i$, with attributes $a_{(i,j)}$, is defined as:

$$d_i = \text{str}(a_{(i,1)}) \bullet @ \bullet \text{str}(a_{(i,2)}) \bullet @ \bullet, \ldots, \bullet @ \bullet \text{str}(a_{(i,n)})$$

where • denotes a string concatenation operator and str is a function that converts an attribute $a_{(i,j)}$ to a string. The symbol @ represents a delimiter inserted for ease of parsing in word breaking. For example, a point descriptor for the set of attributes described in the table above is:
"Analog Input #1101@507_5P2.RET_AIR@Analog Input@Return Air Temperature@Thermistor@DOF"

Concatenator 121 may omit and/or modify certain attribute values during the concatenation process. According to an exemplary embodiment, attributes values that are solely numeric are omitted from the point descriptor by the concatenator 121. Thus, in the example above, the point descriptor did not include the attribute value "68," corresponding to the present value of the return air temperature. Omitting numeric values may advantageously reduce the data that classification and mapping module 108 parses in order to extract relevant substrings, words, symbols, or terms.

Some attributes have an abbreviation and an index (e.g., SP-2 or ZN_T-2). The index may be a numeric quantity. According to an exemplary embodiment, indices are replaced by a predefined character when the attribute value is included in a point descriptor (e.g., SP-2 becomes SP-? and ZN_T-1 becomes ZN_T-?). Modifying attributes with indices may advantageously enable classification and mapping module 108 to identify relevant patterns of substrings, words, symbols, or terms. For example, ZN_T-1 (which may stand for zone temperature sensor 1) may appear only once in a dataset (e.g., for the first zone of a building), but ZN_T-? may appear many times (e.g., for each zone temperature sensor). According to another exemplary embodiment, edit distance (i.e., character position in a substring) may be used in string similarity measurement and exclusion decisions.

A subset of points for classification 120 (i.e., a first subset) may be designated as training data 122. According to an exemplary embodiment, point descriptors of training data 122 are manually assigned BMS point types via a user interface presented on a display screen (e.g., on a display of client device 101). The resulting training data 122 may be used by classification and mapping module 108 to generate or help populate an initial relevant symbol list 102, a skip list 104, and/or a BAS point type list 106. In various embodiments, all or some portion of the labeled point descriptors of training data 122 are used to generate relevant symbol list 102, skip list 104, and/or BAS point type list 106.

Training data 122 may also be used to train a naive Bayes classifier used to classify points as BMS point types. In some embodiments, the same set of training data 122 is used to generate relevant symbol list 102 and to train the classifier 116. In other embodiments, different and/or overlapping sets of training data are used. In some embodiments, training data 122 is manually chosen by a BAS operator. In other embodiments, training data 122 is automatically (e.g., randomly, pseudo-randomly, etc.) chosen by classification and mapping module 108. In other words, classification and mapping module 108 may be configured to select a representative portion of points for classification 120 for training. A representative portion may include equal or nearly equal numbers of point objects or point descriptors from a given point type and/or BAS installation. In an exemplary embodiment, classification and mapping module 108 may select training data 122 as a set of training samples $X=\{x_i \in c_j | 0<i<M, 0<j<K\}$, where a training sample $\langle x_i, c_j \rangle$ comprises of a feature vector (i.e., point descriptor or concatenated string of point descriptors) $x_i$ and a manually assigned point type, $c_j$. M denotes the number of training samples in X. K denotes the number of target classes in the training set.

Memory 160 includes BAS point type list 106. BAS point type list 106 is a collection of point types to which a point may be assigned. For example, a BAS point type list may include:

| Point Types |
|---|
| Box Heating Output |
| Utility Interval Consumption |
| Zone Temperature Setpoint |
| Zone Temperature |
| Supply Flow Setpoint |
| Supply Flow |
| Supply Fan Status |
| Supply Fan Output |
| Return Air Temperature |
| Occupancy |
| Min Outdoor Air Damper Output |
| Interval Demand |
| Interval Consumption |
| Heating Output |
| Effective Housing Setpoint |
| Effective Cooling Setpoint |
| Duct Static Pressure Setpoint |
| Discharge Air Temperature Setpoint |
| Discharge Air Temperature |
| Damper Position |
| Cooling Output |
| Cooling MaxFlow |
| . |
| . |
| . |

In some embodiments, BAS point type list 106 is automatically generated using the manually-labeled points of training data 122. In other embodiments, the point types are standardized types supported by a class of monitoring and reporting applications 130, by an application on client device 101, or by applications of one or more devices. In yet other embodiments, point type list 106 is based on a standard list plus manual edits. In such an embodiment, for example, a BAS operator might manually add, remove, or otherwise modify point types.

BAS ontology 124 is an information system for relating building automation system concepts and objects in a way to facilitates advanced processing tasks. BAS ontology 124 may rely upon the proper classification of points. Implementation details of indexing, retrieval, and querying of ontology is discussed in U.S. patent application Ser. No. 12/831,866, filed Jul. 7, 2010, which is hereby incorporated by reference in its entirety.

Memory 160 includes classification and mapping module 108. Module 108 may probabilistically determine BMS point types for data points using frequency-weighted point descriptor terms. Classification and mapping module 110 may be computer code executable by processor 150. In an exemplary embodiment, classification and mapping module 110 calculates the frequency of relevant terms in concatenated point descriptions (. Classification and mapping module 110 also generates a indicator of the probability that the appearance of one or more substrings in a point description means that the corresponding point belong to a particular BMS point type. The substrings may be found in attributes associated with the points of the building management system.

Classification and mapping module 108 is shown to include word breaker 112. Word breaker 112 may generate a list of substrings, which are likely to indicate that a particular point belongs to a particular point type.

Classification and mapping module 108 is further shown to include learner 114. Learner 114 may generate a matrix of the frequency with which substrings generated by word breaker 112 appear in points for classification 120.

Classifier 116 assigns BMS point types to points of points for classification 120 when a point maximizes the probability that one or more substrings in a point descriptor indicate that the point belongs to the particular point type. GUI services 110 provides a user interface for a BAS operator to manually assign point types to points of training data 122, generate and/or update relevant symbol list 102, generate a frequency matrix, assign and/or update assigned point types, etc. Module 108 may receive inputs from points for classification 120, training data 122, and BAS ontology 124. Module 108 may also receive and transmit data to relevant symbol list 102, skip list 104, learning results 118, and annotated system configuration 126.

Classification and mapping module 108 includes GUI services 110. Data and processing results from classification and mapping module 108, points for classification 120, training data 122, relevant symbol list 102, skip list 104, BAS point type list 106, annotated system configuration 126, etc., may be accessed by or may be pushed to a monitoring application 130 with several graphical user interface (GUI) elements (e.g., widgets, dashboard controls, windows, etc.). According to an exemplary embodiment, a user (e.g., a BAS operator) may use web-based monitoring applications 130 to view and navigate real time dashboards relating to the classification of points described herein. The GUI elements may list and/or summarize points for classification 120 and/or training data 122. A user may utilize GUI services 110 to manually assign BMS point types to points of training data 122. The GUI elements may also allow a BAS operator to start, modify, or end the processes for automatic generation of relevant symbol list 102, skip list 104, and/or BAS point type list 106. A user may utilize GUI services 110 to manually add, remove, or modify terms or point types from lists 102, 104, 106. The GUI elements may also allow a user to view the results of the frequency calculations and probability calculations by learner 114. A user may utilize GUI services 110 to view and/or modify the assigned point types and data points from classifier 116 and/or annotated system configuration 126.

According to an exemplary embodiment, the GUI elements may also allow a user to map spatial relationships among points, equipment, and building spaces. For example, a user may assign location (e.g., building A, first floor, zone 1) to a zone temperature sensor associated with a zone temperature point. In some embodiment, the a list of automatically discovered points from BAS installations 170 is shown. In some embodiments, the automatically generated relevant symbol list 102, skip list 104, BAS point type list 104 are displayed a user. According to an exemplary embodiment, GUI elements may include a drag-and-drop interface. The interface may be configured to allow a user to drag point descriptors from a list and drop the point descriptors in an appropriate locations in a representation of a building (e.g., a two-dimensional or three-dimensional rendering the building). For example, a point descriptor for a zone temperature sensor on the east wing of the third floor of a building may be dragged from a list to a visual representation of the third floor's east wing. The interface may also be configured to assign relationship among devices and point descriptions. For example, a user may be able to draw a line (e.g., using an input device), on the visual representation of the building, connecting a temperature setpoint device with corresponding air handling unit.

The user interface or report (or underlying data engine) may be configured to aggregate and categorize data points by point type, BAS installation, etc. The GUI elements may include charts or histograms that allow the user to visually analyze the data points. Processing circuit 140 may include one or more GUI servers, services, or engines (e.g., a web service) to support such applications. Further, in some embodiments, applications and GUI engines may be included outside of the processing circuit 140 (e.g., as part of a smart building manager). Processing circuit 140 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Processing circuit 140 may be configured to provide the results of any such processing to other databases, tables, XML files, or other data structures for further querying, calculation, or access by, for example, external monitoring and reporting applications 130.

Classification and mapping module 108 includes word breaker 112. According to an exemplary embodiment, word breaker 112 receives point data from BAS installations and parses them into substrings, words, symbols, terms, etc., based on a statistical model of n-grams. Point data may be received at word breaker 112 from BAS installations 170 via communications electronics 128. Point data may also be received from points for classification 120. word breaker 112 may operate on the data stored in points for classification 120 or training data 122. According to an exemplary embodiment, word breaker 112 operates on the points descriptors of training data 122, which have manually-assigned types. According to another exemplary embodiment, word breaker 112 operates during a "learning" or "training" phase of the classification process described herein.

Word breaker 112 may operate on point data stored in training data 122 to generate one or more collections of BAS terms or symbols. These include relevant symbol list 102 and skip list 104. Relevant symbol list 102 includes substrings, words, symbols, terms, etc., that correlate a data point and a point type. That is, the presence of one or more of the substrings on the relevant symbol list 102 in a point descriptor (e.g., attributes) may indicate a statistical likelihood that the point descriptor belongs to a certain point type. In the discussion herein, "substring," "word," "term," and "symbol" are used interchangeably, and include words, abbreviations, and alpha-numeric descriptors. The substrings may be in different languages. According to an exemplary embodiment, relevant symbol list 102 includes only substrings from training data 122. Relevant symbol list 102 may include multiple words, symbols, terms, abbreviations, etc. (in multiple languages), corresponding to the same data type. This advantageously eliminates the needs for a grammar-, dictionary-, or language-based parser. For example, for descriptions associated with an outside air temperature sensor, the relevant symbol list may include (to the extent these terms are used in training data 122): OAT, OT, OutsideTemp, OutsideTemperature, Außentemperaturfühler, ATF, 外部の温度センサ, 室外温度传感器, etc. Relevant symbol list 102 may include a sufficient baseline of terms to accurately (or some approximation thereof) classify points. Word breaker 112 may include a query rewriting scheme and/or word suggestions to correct for misspelled or incomplete point descriptions.

Skip list 104 includes substrings, words, symbols, terms, etc., that will not be taken into account during frequency analysis (in some embodiments, carried about by learner 114). A symbol may be added to skip list 104 when it occurs in many training samples across point types. A high frequency may indicate that the substring is always or almost always included in BAS point descriptors and will not be useful in distinguishing between point types. For example, "BAS" may be a substring that is included in all point descriptors for a given BAS installation. Because "BAS" is not likely to indicate what point type (e.g., Supply Flow Setpoint, Supply Flow, etc.) a data point belong to, "BAS" may be added to skip list 104.

According to an exemplary embodiment, word breaker 112 is configured to generate relevant symbol list 102, skip list 104, etc., automatically. In other embodiments, a user may manually add, remove, and/or modify terms in the lists. Relevant symbol list 102, skip list 104, etc. may include multilingual terms. Lists 102, 104 may also include terms found from multiple BAS installations. Lists 102, 104 may also store charts, databases, arrays, data objects, etc. that describe the terms. For example, a relational database may be used to store attributes for one or more terms, including whether they are relevant terms or terms to be skipped. Lists 102, 104 may include past and/or current lists.

Memory 160 includes learner 114. Learner 114 is an implementation of the probability calculation methods discussed herein. Two exemplary embodiments of learner 114 are described in greater detail in the discussions of FIGS. 2A, 2B. Learner 114 receives substrings from relevant symbol list 102 and point descriptions from training data 122. In one embodiment (described in FIG. 2A), learner 114 calculates the frequency that substrings in relevant symbol list 102 appear in attributes of training data 122. Learner 114 also generates a matrix with columns of attributes of the same point type (concatenated into one string), rows of each substring of the relevant symbol list 102, and individual elements of the frequency that each of the relevant substrings appear in the concatenated descriptions. Using the frequency matrix, learner 114 also generates a description of a probability, for each substring in the relevant symbol list 102, that the presence of a substring in a description of the data point indicates that the data point belongs to a particular point type. In another embodiment (described in FIG. 2B), learner 114 generates a frequency matrix, similar to the one described above. Using singular value decomposition (SVD), learner 114 also decomposes the frequency matrix into three different matrices. According to an exemplary embodiment, SVD filters the non-relevant substrings within a point type. Learner 114 also reconstructs an approximated frequency matrix as the product of portions of the three decomposed matrices. Learner 114 also generates a representation of the probability (e.g., a cosine distance), between a vector associated with a relevant substring and a vector associated with point descriptors of a point type. In some embodiments of learner 114, weighted frequencies are used to generate the frequency matrix. A BAS operator may utilize GUI services 110 to initiate, modify, end, and/or view the processes associated with learner 114. Frequency matrices and probabilities calculations may be transmitted and stored in learning results 118.

Memory 160 includes classifier 116. According to an exemplary embodiment, classifier 116 is an implementation of the naive Bayes categorization discussed herein. In other embodiments, classifier 116 may be used with latent semantic indexing. Classifier 116 receives points descriptions (e.g., attributes) from points for classification 120 and representations of probability computations from learner 114. Classifier 116 maximizes a probability that the presence of a substring from the relevant symbol list 102 in the attributes of a data point indicates that the data point belongs to a particular point type. Classifier 116 probabilistically assigns a point type from BAS point type list 106 to the point descriptors of points for classification 120 based on the maximized probability. A BAS operator may utilize GUI services 110 to initiate categorization, view the assigned point descriptions, etc. GUI services 110 may be configured to allow a BAS operator to manually reassign a point descriptor to a different point type. The assigned point types may be transmitted and stored in annotated system configuration 126.

In some embodiments, classifier 116 may be additionally configured to determine whether further training must be completed on points for classification 120 (e.g., after additional points from BAS installations 170 have been added to points for classification 120). Classifier 116 may do so by calculating a dissimilarity between a relevant symbol list 102 generated using a previous dataset from points for classification 120 and a relevant symbol list 102 generated using a current dataset from points from classification 120. When further training is required, classifier 116 may transmit a command to word breaker 112 to generate a new relevant symbol list 102 using a different set of training data 122 from points for classification 120, and learner 114 to generate a new frequency matrix and probability description using the new relevant symbol list 102.

Memory 160 includes annotated system configuration 126. According to an exemplary embodiment, annotated system configuration includes the results of classification and mapping module 108. That is, annotated system configuration includes the points of BAS installations 170 and their assigned point types. Annotated system configuration may receive point descriptions from points for classification 120 and assigned point types from classifier 116. When retraining is required, annotated system configuration 126 may transmit previous configurations (e.g., points and assigned point types) to learning results 118. The computational results of classifier 116 from retraining may then be stored in annotated system configuration 126.

Memory 160 includes learning results 118. According to an exemplary embodiment, learning results 118 includes the computational results from word breaker 112, learner 114, classifier 116, etc. An item $\omega_l$, such as point descriptors, in learning results 118 may be represented as:

$$\omega_l = \langle \vartheta_l, \langle p(\vartheta_l), \langle p(\vartheta_l|c_1), p(\vartheta_l|c_2), \ldots, p(\vartheta_l|c_K) \rangle \rangle \rangle$$

where $\vartheta_l$ represents the lth symbol in a dictionary, $p(\vartheta_l)$ is the probability of $\vartheta_l$ in the training data 122, and $p(\vartheta_l|c_K)$ is a probability that a symbol $\vartheta_l$ appears in a point type $c_j$. In some embodiments, learning results includes frequency matrix generated by learner 114. Learning results may also include probability descriptions generated by learner 114. According to an exemplary embodiment, learning results 118 may further include results from past iterations of the computations carried out by processing circuit 140.

Figure 2A:
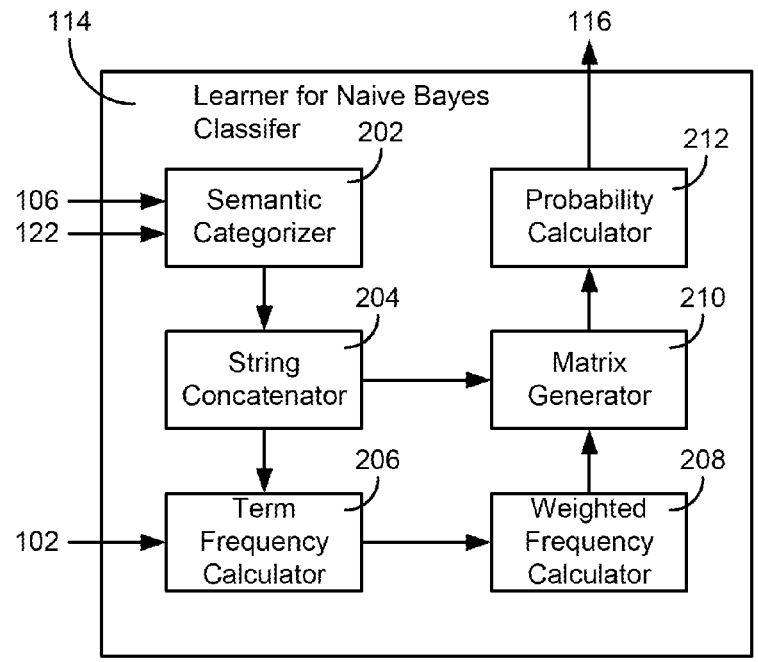
FIG. 2A is a detailed block diagram of the learner of FIG. 1 for a naive Bayes classifier, according to an exemplary embodiment.
Figure 2B:
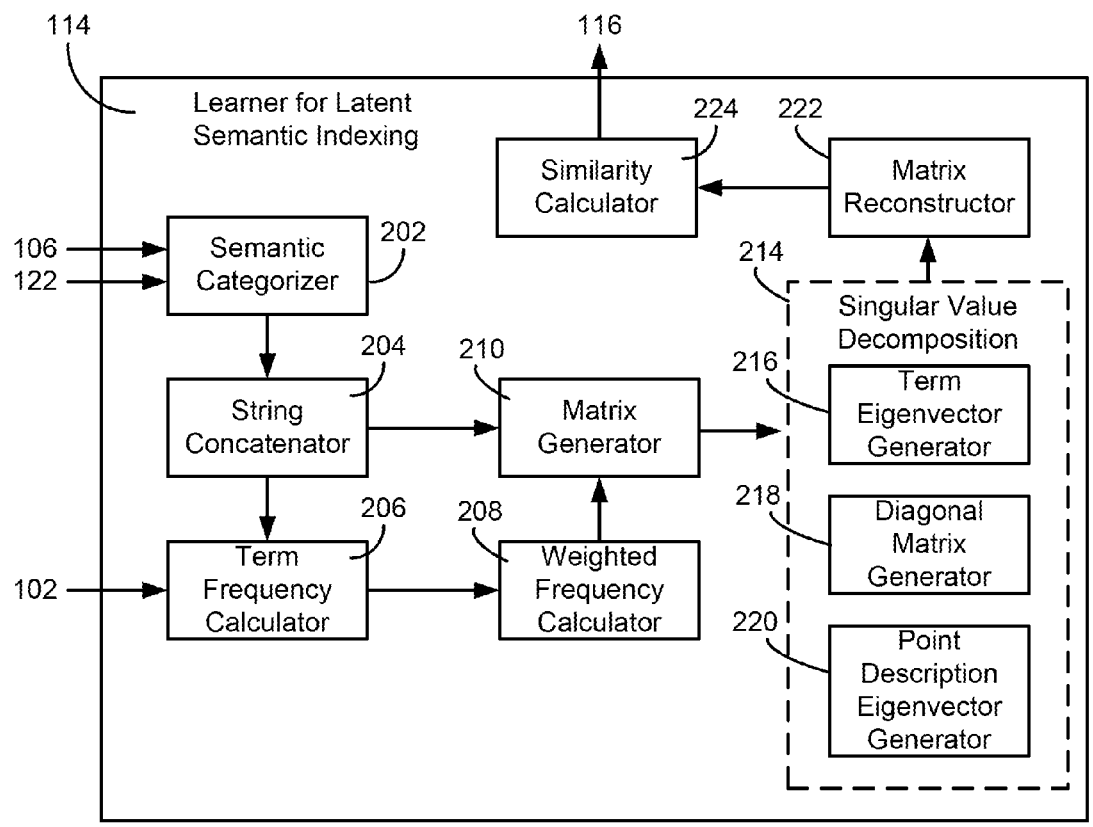
FIG. 2B is a detailed block diagram of the learner of FIG. 1 for latent semantic indexing, according to an exemplary embodiment.

Referring now to FIGS. 2A, 2B, detailed block diagrams of learner 114 of FIG. 1 are shown, according to exemplary embodiments. The embodiment of learner 114 of FIG. 2A may be used in classifying points using a naive Bayes model. The embodiment of learner 114 of FIG. 2B may be used in classifying points using latent semantic indexing. One, the other, or both of the embodiments of learner 114 shown in FIGS. 2A, 2B may be implemented as part of classification and mapping module 108 on processing circuit 140. In both embodiments, learner 114 may receive inputs from BAS point type list 106, training data 122, and relevant symbol list 102. Learner 114 may be configured to calculate the number of times or frequency that terms in relevant symbol list appear in point descriptions of training data 122. Learner 114 may also generate a matrix describing the frequencies. Learner 114 may also generate a representation of the probability that the presence of a substring from relevant symbol list 102 in a point description indicates that the point description belongs to a particular point type. The probability computations may be output to classifier 116.

Referring now to FIG. 2A, a detailed block diagram of learner 114 of FIG. 1 for a naive Bayes classifier is shown, according to an exemplary embodiment. Learner 114 includes semantic categorizer 202. Semantic categorizer 202 receives point types from BAS point type list 102 and point descriptors from training data 122. According to an exemplary embodiment, the point descriptors of training data 122 are manually labeled with point types. Semantic categorizer 202 organizes the point descriptors into groups or categories corresponding to the point type. For example, one or more point descriptors that belong to the zone temperature sensor point class are grouped together. The grouped point descriptors are transmitted to string concatenator 204.

Learner 114 includes string concatenator 204. String concatenator 204 receives point descriptors grouped according to point type from semantic categorizer 202. According to an exemplary embodiment, string concatenator 204 concatenates point descriptors of the same type into one string. Thus, for example, if there are one hundred point descriptors in each of twenty-five point types, string concatenator 204 outputs twenty-five strings. Each string corresponds to one point type and contains the concatenated point descriptors that point type. The concatenated strings are transmitted to term frequency calculator 206 and matrix generator 210. In other embodiments, the strings of a given BMS point type are neither grouped together by semantic categorizer 202 nor concatenated by string concatenator 204. Rather, the point types from BAS point type list 106 and point descriptors from training data 122 are transmitted directly to term frequency calculator 206.

Learner 114 includes term frequency calculator 206. According to an exemplary embodiment, term frequency calculator 206 receives concatenated strings from string concatenator 204 and terms from relevant symbol list 122. Term frequency calculator 204 calculates, for each substring in relevant symbol list 122 and for each concatenated string, the frequency that the substring appears in the concatenated string. The frequency $f^{c_j}(\vartheta_l)$ that substring $\vartheta_l$ occurs in BMS point type $c_j$ is:

$$f^{c_j}(\vartheta_l) = \sum_{x=1}^{L} f_{(x,l)}^{c_j},$$

where L is the number of substrings in relevant symbol list 102. According to an exemplary embodiment, each concatenated string corresponds to one point type. In some embodiments, the calculated frequencies are transmitted directly to matrix generator 210. In other embodiments, the calculated frequencies are transmitted to weighted frequency calculator 208.

Learner 114 includes weighted frequency calculator 208. Weighted frequency calculator 208 receives calculated frequencies from term frequency calculator 206. According to an exemplary embodiment, direct usage of a raw frequency in estimating probability may falsely emphasizes certain features. This may be true, for example, if a symbol occurs in many point types (i.e., this symbol has a high frequency). As a result, the symbol will tend to incorrectly emphasize the points that contain the symbol. For example, a point description may include the customer name and a building floor level. Both the customer name and building floor level may have a high number of occurrences and may not be good features to classify the descriptor. The relevance of a irrelevant symbol in classification can be reduced. To do so, a frequency weighting scheme may be applied before converting raw frequencies into probabilities. According to an exemplary embodiment, inverted document frequency is to panelize irrelevant terms. The inverse measure of the informativeness $idf(\vartheta_l)$ of a symbol $\vartheta_l$ is $$idf(\vartheta_l) = \log\left(\frac{N}{df(\vartheta_l)}\right),$$

where N is the total number of symbols observed from the training set and $df(\vartheta_l)$ is the number of point descriptors containing a symbol $\vartheta_l$. Applying invented document frequency to the term frequency calculation (as described in the discussed of term frequency calculator 206), the weighted frequency of a symbol $\vartheta_l$ is $$f_{(x,y)}' = f_{(x,y)} \times idf(\vartheta_l).$$

According to an exemplary embodiment, the weighted frequency is calculated for each symbol in relevant symbol list 102 across the concatenated strings for each point type. The weighted frequencies are transmitted to matrix generator 210.

Learner 114 includes matrix generator 210. According to an exemplary embodiment, matrix generator 210 receives concatenated strings from string concatenator 204 and weighted frequencies from weighted frequency calculator 208. Matrix generator 210 constructs an M by K matrix A:

$$A = \begin{bmatrix} f_{(1,1)}' & \cdots & f_{(M,1)}' \\ \vdots & \ddots & \vdots \\ f_{(1,K)}' & \cdots & f_{(M,K)}' \end{bmatrix},$$

where M is the number of training samples in the set of training samples X (i.e., the number of concatenated strings of point descriptors) and K is the number of target classes in a training set (i.e., the number of symbols in relevant symbol list 102). Each element represents the weighted frequency $f_{(x,y)}'$ of a symbol in a concatenated string of point descriptors. Each row represents occurrences of a symbol across strings of point descriptors. Each column represents the frequency of symbols in a string of point descriptors. According to an exemplary embodiment, the initial values of A are filled with 1.0, to prevent divide by zero error. In some embodiments, matrix generator 210 receives un-weighted frequencies from term frequency calculator 206. In other embodiments, matrix generator 210 receives point descriptors along with manually assigned point types (but not concatenated strings) from training data 122. In such an embodiment, a matrix may be constructed by matrix generator 210, with each element corresponding to the frequency of a symbol, a point descriptor, and a point type. Matrix generator 210 transmits the constructed matrix A to probability calculator 212. In some embodiments, matrix generator 210 transmits matrix A to learning results 118.

According to an exemplary embodiment, and as described below, latent semantic indexing may be generate a matrix A. Matrix A may be deconstructed using singular value decomposition, as described below. A portion of the deconstructed matrices may be used to reconstruct a matrix A', which is an approximation of matrix A. Matrix A' may be used in place of matrix A in the discussion herein.

Learner 114 includes probability calculator 212. Probability calculator 212 receives frequency matrix A or matrix A' from matrix generator 210. Probability calculator 212 uses frequency matrix A or matrix A' to calculate the probability $p(\vartheta_l)$ of the frequency of a symbol $\vartheta_l$ in a training sample (i.e., a concatenated string):

$$p(\vartheta_l) = \frac{\sum_{x=1}^{L} f_{(x,y)}'}{\sum_{x=1}^{L} \sum_{y=1}^{M} f_{(x,y)}'},$$

where $f_{(x,y)}'$ is the weighted frequency of a symbol in a training sample (i.e., a concatenated string), L is the number of symbols in relevant symbol list 102, and M is the number of training samples in the set of training samples X (i.e., the number of concatenated strings of point descriptors).

According to an exemplary embodiment, probability calculator 212 generates a description of the probability that the presence of one of the terms in relevant symbol list 102 in a representation of a data point indicates that the data point belongs to a particular point type. That is, probability calculator 212 also uses frequency matrix A or matrix A' to calculate the probability $p(\vartheta_l | c_K)$ that a symbol $\vartheta_l$ appears in a class $c_j$:

$$p(\vartheta_L \mid c_j) = \frac{f^{c_j}(\vartheta_l)}{n_j},$$

where $f^{c_j}(\vartheta_l)$ is the frequency of a symbol $\vartheta_l$ in point type $c_j$ (as described in the discussion of term frequency calculator 206 and weighted as described in the discussion of the weighted frequency calculator 208).

$$n_j = \sum_{x=1}^{L} \sum_{r=1}^{M} f_{(x,y)}^{c_j}$$

and is the total occurrence of all symbols in the training sample (i.e., concatenated string) labeled $c_j$. The probability $p(\vartheta_l \mid c_K)$ that symbol $\vartheta_l$ appears in class $c_j$ is transmitted to classifier 116. In some embodiments, probability calculator 212 transmits probability $p(\vartheta_l \mid c_K)$ to learning results 118.

Referring now to FIG. 2B, a detailed block diagram of learner 114 of FIG. 1 for latent semantic indexing (LSI) is shown, according to an exemplary embodiment. LSI is a semantic sensitive document clustering technique that captures and preserves recurring term usage patterns. LSI maps documents and queries into a lower dimensional space. LSI involves the creation of a term to document matrix A. The matrix A is an u by v matrix, where u is the number of documents (e.g., concatenated strings corresponding to point types), and v is the number of terms (e.g., from relevant symbol list 102) observed from a document collection (set of concatenated strings). The matrix A described in this paragraph may be similar to the matrix A described in the discussion of matrix generator 210 (FIG. 2A). Semantic categorizer 202, string concatenator 204, term frequency calculator 206, weighted frequency calculator 208, and matrix generator 210 of FIG. 2B are substantially as described in the discussion of FIG. 2A.

In the embodiment of FIG. 2B, learner 114 additionally includes singular value decomposition (SVD) 214. SVD 214 receives a term to document matrix A from matrix generator 210. SVD 214 includes term eigenvector generator 216, diagonal matrix generator 218, and point description eigenvector generator 220. By using SVD, matrix A can be decomposed into the product of three different matrices: the term eigenvector U; the diagonal matrix of singular values S; and the point description eigenvector $V^T$. Generators 216, 218, 220 construct matrices U, S, and $V^T$, respectively. U is a matrix of eigenvectors derived from a term-to-term similarity matrix defined in the document space by measuring correlation. (The term-to-term similarity matrix serves similar role of the covariance matrix in principal component analysis.) $V^T$ is a matrix of eigenvectors derived from a document-to-document (i.e., concatenated string-to-concatenated string) similarity matrix defined in the term space by comparing a term profile of a document. S is an r by r diagonal matrix of singular values, where r is the rank of A. Matrices U, S, and $V^T$ may be referred to as the second, third, and fourth matrices respectively. SVD 214 transmits the matrices U, S, and $V^T$ to matrix reconstructor 222. In other embodiments, more, fewer, or different matrices are transmitted to matrix reconstructor 222.

In the embodiment of FIG. 2B, learner 114 includes matrix reconstructor 222. Matrix reconstructor 222 receives matrices U, S, and $V^T$ from SVD 214. Matrix reconstructor 222 is configured to construct a matrix A' that approximates term to document matrix A. Matrix A' may be referred to as the fifth matrix. Matrix A can be approximated by keeping first k singular values from S, and the corresponding columns from U and $V^T$. k is the approximation quality control constant. k should be large enough to allow for fitting of the characteristics of the data and small enough to eliminate the non-relevant representational details. According to an exemplary embodiment, k is set to 70%. In other embodiments, k may be greater than or less than 70%. Approximation of the original term-to-document matrix A can be obtained by $$A' = U_k S_k V_k^T \approx A,$$

where $U_k$ and $V_k^T$ represent matrixes that keep the first k columns from U and $V^T$, and $S_k$ is a matrix that has the first k singular values. Matrix reconstructor 222 transmits matrix A' to similarity calculator 224. In some embodiments, matrix A' may be transmitted to learning results 118.

With a careful selection of k (e.g., determined by evaluating precision and recall), SVD provides a modified vector space, where non-relevant terms within a BMS point type are filtered. Transitive co-occurrence of terms is captured by measuring the correlations among terms, while principal component analysis (PCA) uses covariance analysis. LSI assumes that there are strong associations between terms in text. According to an exemplary embodiment, such associations exist in the building management data point classification domain. Eventually, the dimension reduction step in LSI captures the semantic relationships by analysis of term co-occurrences. The dimension reduction step modifies the component matrices in such a way that terms observed in some documents may appear with greater or lesser estimated frequency and some non-observed terms in the input may appear (at least fractionally).

According to an exemplary embodiment, matrix A' is used to calculate the probability $p(\vartheta_l)$ of the frequency of a symbol $\vartheta_l$ in a training sample (i.e., a concatenated string). Matrix A' may also be used to calculate the probability $p(\vartheta_l \mid c_K)$ that a symbol $\vartheta_l$ appears in a class $c_j$. Thus, the methods and systems described herein may advantageously utilize latent semantic indexing in conjunction with a naive Bayes classifier.

In the embodiment of FIG. 2B, learner 114 includes matrix similarity calculator 224. Similarity calculator 224 may receive approximated term-to-document matrix A' from matrix reconstructor 222. Similarity calculator 224 generates a representation of the probability that the presence of one of the terms in relevant symbol list 102 in a description of a data point indicates that the data point belongs to a particular point type. The probability may be represented by a cosine distance, which measures the probability based on an angle between a query and a target vector. The similarity or cosine distance $\delta(q, t_k)$ between a query vector q (representing a substring in relevant symbol list 102) and a training sample vector $t_k$ (representing a concatenated string of point descriptors in a given class) is:

$$\delta(q, t_k) = \cos(\theta) = \frac{q \cdot t_k}{\|q\| \cdot \|t_k\|}$$

The similarity or cosine distance $\delta(q, t_k)$ may be transmitted to classifier 116. In some embodiments, matrix similarity calculator 224 may transmit similarity or cosine distance $\delta(q, t_k)$ to learning results 118.

Figure 3:
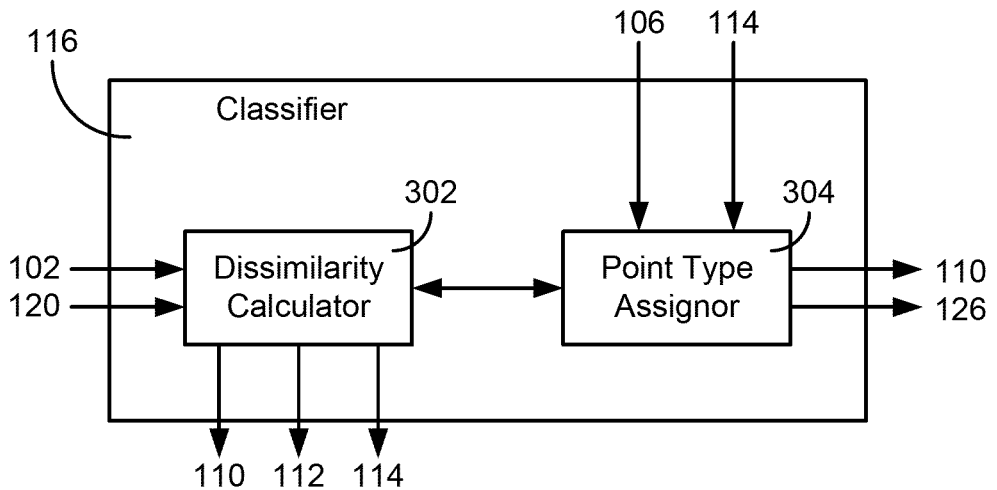
FIG. 3 is a detailed block diagram of the classifier of FIG. 1, according to an exemplary embodiment.

Referring now to FIG. 3, a detailed block diagram of classifier 116 of FIG. 1 is shown, according to an exemplary embodiment. Classifier 116 of FIG. 3 may be configured to classify points using a naive Bayes model or latent semantic indexing. In other embodiments, different methods may be used. Classifier 116 may be implemented as part of classification and mapping module 108 on processing circuit 140. Classifier 116 may receive input from relevant symbol list 102, BAS point type list 106, points for classification 120, and training data 122. Classifier 116 may determine a maximum probability that the presence of a substring from the relevant symbol list 102 in the description of a data point indicates that the data point belongs to a particular point type. Classifier 116 assigns a point type from BAS point type list 106 to the point descriptors of points for classification 120 based on the probabilistic determination. Classifier 116 may also be configured to determine whether retraining is required. The assigned point type may be output to GUI services 110 and annotated system configuration 126.

Classifier 116 includes dissimilarity calculator 302. Dissimilarity calculator 302 receives symbols from relevant symbol list 102 and point descriptors from points for classification 120. According to an exemplary embodiment, dissimilarity calculator 302 determines whether retraining is required. Retraining may include generation of a new relevant symbol list 102, frequency matrix, and probability representation. Retraining is required when the terms used in the point descriptors of points for classification 120 are sufficiently (i.e., beyond a threshold amount) different from the terms in relevant symbol list 102. This indicates that the classification and mapping module 108 is less than well-suited, with the then-existing relevant symbol list 120, frequency matrix, and probability representation, to probabilistically classify points based on the symbols in the point descriptors. In some embodiments, dissimilarity calculator 302 may be provided as part of classifier 116. In other embodiments, dissimilarity calculator 302 may be provided as part of learner 114 or as a separate component of classification and mapping module 108.

The need for retraining may arise, e.g., with a new set of points that is added to points for classification 120. For example, a new BAS installation (with a new set of data points) may be added to the system with processing circuit 140. In some embodiments, the need for new training is determined based on how many symbols have been seen or not been seen by classifier 116. Given a new set of points, keyword and symbol extraction is performed by, e.g., word breaker 112. Keyword and symbol extraction is described in the discussion of word breaker 112 and results in a new list of relevant symbols. B is a new set of vocabularies (i.e., keywords, symbols, terms, etc.) from the new set of points (i.e., new query) to be classified and D is the set of terms (e.g., relevant symbol list 102) obtained during the training phase. The dissimilarity between D and B can be measured with the following form:

$$(B, D) = \frac{|B \cup D| - |B \cap D|}{|B \cup D|} = 1 - \frac{|B \cap D|}{|B \cup D|}.$$

This is the Jaccard index or dissimilarity, which measures the complementary rate of intersection of two sets. If two sets are identical (i.e., the terms from both sets of points are identical), then the equation equals one. If an intersection of two sets is empty (i.e., the two sets of the points share no terms), then the equation equals zero. A thresholding parameter (e.g., (B,D) =0.3) can be used to determine when a classifier needs additional training. When retraining is required, a notification may be provided to GUI services 110. Dissimilarity calculator may also provide commands to, e.g., word breaker 112 to generate a new relevant symbol list and learner 114 to generate a new frequency matrix and/or probability description. When retraining is not required, dissimilarity calculator 302 may provide a command to point type assignor 304 to probabilistically assign point types to points for classification 120. In other embodiments, a different method (other than calculating the Jaccard dissimilarity between relevant terms of two sets of points) may be used to determine when retraining is required.

Classifier 116 includes point type assignor 304. Point type assignor 304 receives point descriptors from points for classification 120, point types from BAS point type list 106, and probability descriptions from learner 114. According to an exemplary embodiment, point type assignor 304 probabilistically assigns point types (from BAS point type list 106) to point descriptors (from points for classification 120) using probability representations (from learner 114). A point type that maximizes the value of the probability representation is assigned to the particular point. The assigned point types are transmitted to GUI services 110 and/or annotated system configuration 126.

In some embodiments, point type assignor 304 is a naive Bayes classifier. Naive Bayes is an efficient and effective inductive learning algorithms for machine learning and data classification. Typically, an example X (e.g., a set of concatenated strings) is represented by a tuple of attribute values X= $\langle x_1, x_2, \ldots x_n \rangle$, where $x_i$ (e.g., one concatenated string) is the value of ith attribute of example X. C represents the classification variable, and c is the value (e.g., a point type label) of C. Calculation of probability of example X becomes class c is:

$$p(c \mid X) = \frac{p(X \mid c)p(c)}{P(E)}.$$

According to an exemplary embodiment, all attributes (e.g. words in a document) are independent given a class label of the class variable. Then p(X|c) is equivalent to $$p(X \mid c) = p(x_1, x_2, \ldots, x_n \mid c) = \prod_{i=1}^{n} p(x_i \mid c)$$

Example X may be classified by finding a class value $c_j$ that maximizes the above equation. That is, $$\text{classify}(X) = \arg\max_j \left( \prod_{i=1}^{n} p(x_i \mid c_j) \right), 0 < j < K,$$

where K is the number of possible class values (e.g. a number of point types).

In the embodiment of FIG. 3, the point type assignor may be a naive Bayes classifier of the form:

$$\text{classify}(X) = \arg\max_j \left( \prod_{l=1}^{n} p(\vartheta_l \mid c_j) \right), 0 < j < K,$$

where $p(\vartheta_l \mid c_K)$ is the probability that symbol $\vartheta_l$ appears in class $c_j$, received from the probability calculator 212. Point type assignor 304 assigns, to a point descriptor, the point type that maximizes the equation. Various mathematical methods may be used to compute the naive Bayes classifier. In other embodiments, point type assignor 304 is a classifier for latent semantic indexing. Point type assignor 304 assigns to a point descriptor the point type that maximizes the similarity or cosine distance $\delta(q,t_k)$, as described in the discussion of similarity calculator 116. The similarity or cosine distance may have a maximum value of one. A point type that maximizes the cosine distance results in the cosine distance approach (or reaching) one.

Figure 4:
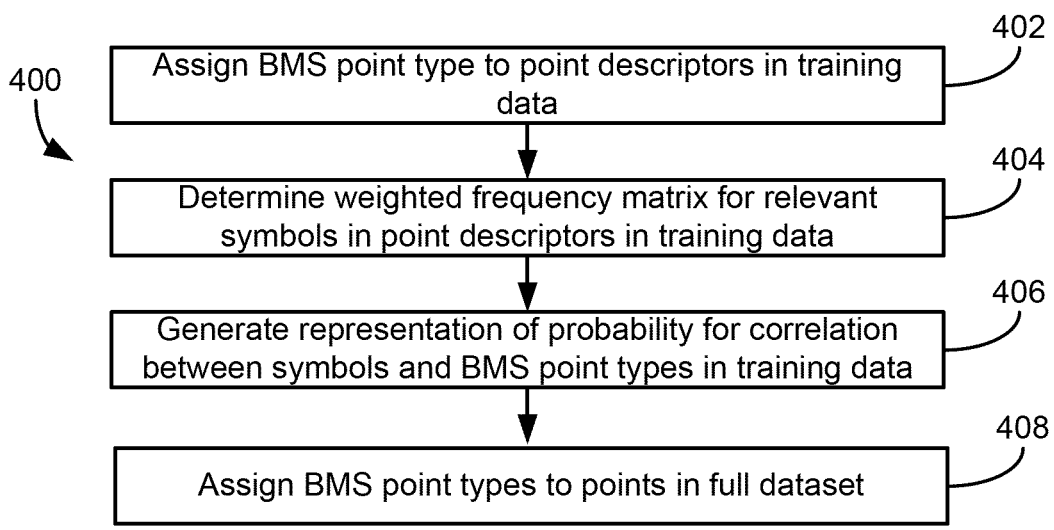
FIG. 4 is a flow diagram of a process for probabilistically assigning building management system point types, according to an exemplary embodiment.

Referring now to FIG. 4, a flow diagram of a process 400 for probabilistically assigning point types is shown, according to an exemplary embodiment. Process 400 may be implemented on, e.g., processing circuit 140. In some embodiments, steps 402-406 of process 400 may be characterized as a "learning" or "training" phase. Steps 402-406 may operate on a subset of data, whereas step 408 operates on a full set of data (e.g., all point descriptors from BAS installations 170). Process 400 may be a high-level representation of the process described in more detail in FIGS. 5 and 6.

Process 400 includes assigning point types to point descriptors in training data (402). According to an exemplary embodiment, the point types are assigned manually (e.g., by a BAS operator). A BAS operator may use one or more GUIs provided by GUI services 110 to assign point types. The point types may include those enumerated in the discussion of BAS point type list 106 (FIG. 1). The point descriptors in training data may be a subset of all the point descriptors in the full dataset (e.g., across all BAS installations). Step 402 may advantageously reduce the number of points that are required to be manually assigned compared to the current process, which involves complete manual classification of points. According to an exemplary embodiment, the training data may be selected so that the manually-assigned point descriptors are evenly or nearly evenly distributed across point types, physical location (e.g., BAS installation), etc.

Process 400 includes determining a weighted frequency matrix for relevant symbols in the point descriptors in the training data (404). Relevant symbols may be those identified by, e.g., processing circuit 140, to most likely indicate what BMS point type a point belongs to. That is, the presence of the symbol in the point description increases the probability that the corresponding point belongs to a particular point type. Relevant symbols may be determined by word breaker 112 and stored in relevant symbol list 104 (FIG. 1). Processing circuit 140 may calculate at what frequency the symbols occur in each of the point descriptors in the training data. In some embodiments, the points descriptors of the same class are concatenated into one string. In such embodiments, term frequency calculator 206 calculates the frequency that the relevant symbols occur in the strings for each point type. In some embodiments, the calculated frequency may be weighted so that it more accurately represents the utility of a substring in indicating what point type a data point is. For example, a large proportion of points in a dataset may include general substrings, such as "BAS." Because the substring BAS is unlikely to suggest what point type the point belongs to, it is less useful than other terms, such a "ZN_T-?" (indicating zone temperature). Using the calculated frequency alone may overemphasize commonly-appearing, but less relevant terms. According to an exemplary embodiment, inverted document frequency (IDF) is used to weight the frequencies. Processing circuit 140 may be configured to generate a matrix of the weighted frequencies. According to an exemplary embodiment, matrix generator 210 constructs a matrix with columns of point descriptions of the same point type (concatenated into one string), rows of each substring of the relevant symbol list 102, and individual elements of the weighted frequency that relevant symbols appear in the concatenated descriptions.

According to an exemplary embodiment, latent semantic indexing may be used in conjunction with a naïve Bayes classifier. A matrix A' may be generated using latent semantic indexing. Matrix A' may then be used to calculate the probability $p(\vartheta_l)$ of the frequency of a symbol $\vartheta\ \vartheta$ in a training sample (i.e., a concatenated string) and the probability $p(\vartheta_l|c_K)$ that a symbol $\vartheta_l$ appears in a class $c_j$.

Process 400 includes generating a representation of the probability of correlation between relevant terms and point types (406). The representation describes the probability that the presence of one or more relevant terms in a description of a data point indicates that the data point belongs to one of a plurality of point types. In some embodiments, for example, when a naive Bayes classifier is used, a probability $p(\vartheta_l|c_K)$ that symbol $\vartheta_l$ appears in class $c_j$ is calculated. This is described in more detail in the discussion of probability calculator 212 (FIG. 21). In other embodiments, for example, when latent semantic indexing is used to classify points, a similarity or cosine distance $\delta(q,t_k)$ between a query vector q (representing a substring in relevant symbol list 102) and a training sample vector $t_k$ (representing a concatenated string of point descriptors in a given class) is generated. This is described in more detail in the discussion of similarity calculator 224 (FIG. 2B).

Process 400 includes assigning point types to points in the full dataset (408). The "full dataset" may include all of the points in points for classification 120 or all of the points of BAS installations 170. In other embodiments, a BAS operator may designate a portion of points for classification 120 and/or BAS installations 170 to be assigned point types. According to an exemplary embodiment, the full dataset includes more points than the training dataset. This advantageously obviates the need for manually assigning point types to all points of BAS installations 170. Processing circuit 140 assigns point types by determining a point type-substring pair that maximizes a probability that the presence of the substring in the description of the data point indicates that the data point belongs to the point type. In some embodiments, a naive Bayes classifier may be used. In other embodiments, for example, with latent semantic indexing, a similarity or cosine distance $\delta(q,t_k)$ may be maximized.

Figure 5:
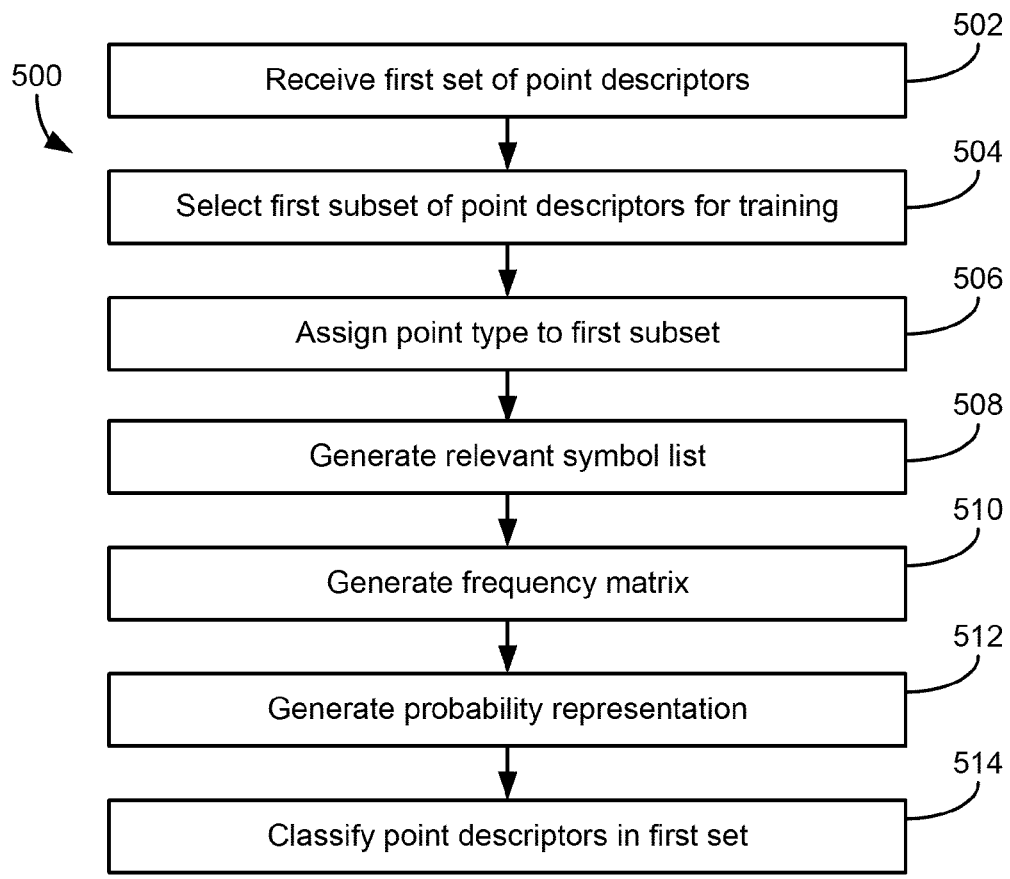
FIG. 5 is a more detailed flow diagram of a process for probabilistically assigning building management system point types, according to an exemplary embodiment.

Referring now to FIG. 5, a more detailed flow diagram of a process 500 for probabilistically assigning point types is shown, according to an exemplary embodiment. Process 500 may be implemented on, e.g., processing circuit 140. In some embodiments, steps 504-514 of process 500 may be characterized as a "learning" or "training" phase. Steps 504-512 may operate on one or more subsets of data, whereas step 514 operates on a full set of data (e.g., all point descriptors from BAS installations 170). Process 500 may be a more low-level description of the process described in FIG. 4.

Process 500 includes receiving a first set of point descriptors (502). The point descriptors may be received at processing circuit 140 from BAS installations 170. The point descriptors may be stored in points for classification 120. In some embodiments, data points (and not point descriptors) may be received at processing circuit 140. Processing circuit 140 may modify (e.g., as described in the discussion of points for classification 120) and concatenate the attribute values for each of the points, and store the now-point descriptors in points for classification 120.

Process 500 includes selecting a first subset of the first set of point descriptors for training (504). According to an exemplary embodiment, the first subset is a proportion of point descriptors selected by a BAS operator. The first subset may be designated by a BAS operator at a user interface generated by GUI services 110 (FIG. 1). The first subset may be stored as training data 122.

Process 500 includes assigning point types to the first subset of point descriptors (506). According to an exemplary embodiment, the point types are manually assigned to the subset. The point types may include those enumerated in the discussion of BAS point type list 106. Manually assigning point types to only a subset of point descriptors and probabilistically assigning classes to the remaining point descriptors eliminates the need to manually label all of the point descriptors. This may advantageously reduce the time, error, etc., associated with completely manual point classification. A BAS operator may use a user interface generated by GUI services 110 (FIG. 1) to label the point descriptors. The labeled point descriptors may be stored as training data 122.

According to an exemplary embodiment, process 500 continues with "classifier training," including steps 508-512, which are described in more detail below. In some embodiments, all of the labeled point descriptors (i.e., the first subset selected in step 504) are used in classifier training. That is, all of the point descriptors that are manually labeled are used to generate a relevant symbol list, frequency matrix, and probability description. In other embodiments, a fewer than all of the labeled point descriptors may be used for classifier training. For example, from the nineteen thousand points (the first subset) that were manually assigned point types, six thousand may be selected for classifier training. The subset that is selected for classifier training may be evenly or near-evenly distributed across point types, physical locations (e.g., BAS installations), etc.

Process 500 includes generating a relevant symbol list using the subset of labeled point descriptors (508). The relevant symbol list may be described as a first plurality of terms. The relevant symbol list includes substrings, words, symbols, terms, abbreviations, etc. (in multiple languages) that are extracted from the point descriptors. As described in the discussion of word breaker 112 (FIG. 1), relevant symbol list 102 (FIG. 1), and step 404 of process 400 (FIG. 4), the relevant symbol list contains substrings that are probabilistically likely to indicate that a point descriptor containing the substring belongs to a particular point type. According to an exemplary embodiment, the relevant symbol list is generated by word breaker 112 and stored as relevant symbol list 102 (FIG. 1). In some embodiments, a skip list may also be generated (as described in the discussion of word breaker 112 and skip list 104). The skip list contains substrings that are determined to be not relevant in determining whether a point descriptor belongs to a particular BMS point type.

Process 500 includes generating a frequency matrix (510). As described in the discussions of matrix generator 210 (FIG. 2A) and step 404 of process 400 (FIG. 4), a frequency matrix includes the frequency that each of the symbols in the relevant symbol list appears in descriptions of the labeled data points. In some embodiments, the frequencies may be weighted (e.g., using inverted document frequency). In some embodiments, the point descriptors of a given point type may be concatenated into one string. According to an exemplary embodiment, matrix generator 210 (FIG. 2A, 2B) constructs the frequency matrix. The process for generating the frequency matrix is described in more detailed in the discussion of FIG. 6. according to an exemplary embodiment, the frequency matrix may be generated using latent semantic indexing.

Process 500 includes generating a probability representation (514). As described in the discussions of probability calculator 212 (FIG. 2A), similarity calculator 224 (FIG. 2B), and step 406 of process 400 (FIG. 4), the probability description describes the likelihood that the presence of one or more symbols in a point descriptor indicates that the point descriptor belongs to a particular point type. The probability description may be of the form $p(\vartheta_I | c_K)$, i.e., the probability that symbol $\vartheta_I$ appears in BMS point type $c_j$. This description may be used when classifying points using a naive Bayes method. The probability description may also be of the form $\delta(q, t_k)$ (describing a similarity or cosine distance). This description may be used when classifying points using latent semantic indexing. The probability description may be generated by probability calculator 212 (FIG. 2A) or similarity calculator 224 (FIG. 2B), and may be based on the frequency matrix generated in step 510.

Process 500 includes classifying points descriptors in the first set (514). The first set of point descriptors includes the first subset, the second subset, and/or additional point descriptors. The first subset includes the manually labeled point descriptors. The second subset includes the unlabeled point descriptors. Process 500 and other methods described herein thus advantageously classify points of the second subset in an automated manner. According to an exemplary embodiment, the points are classified probabilistically, based on the representation generated in step 512. As described in the discussions of point type assignor 304 (FIG. 3) and step 408 of process 400 (FIG. 4), a point type is assigned to a data point descriptor when the particular point type maximizes a probability that substrings in the point descriptor indicate that the data point belongs to the point type. This may be a substring-point type pair that has the greatest indication of probability. In some embodiments, a naive Bayes classifier is used. Processing circuit 140 assigns BMS point types based on calculating:

$$\text{classify}(X) = \arg\max_j \left( \prod_{i=1}^{n} p(\vartheta_i | c_j) \right), 0 < j < K.$$

Various mathematical methods may be used to compute the naive Bayes classifier. In other embodiments, for example, when latent semantic indexing is used, processing circuit 140 maximizes a similarity or cosine distance $\delta(q, t_k)$ between a query vector q (representing a substring in relevant symbol list 102) and a training sample vector $t_k$ (representing a concatenated string of point descriptors in a given class).

Figure 6:
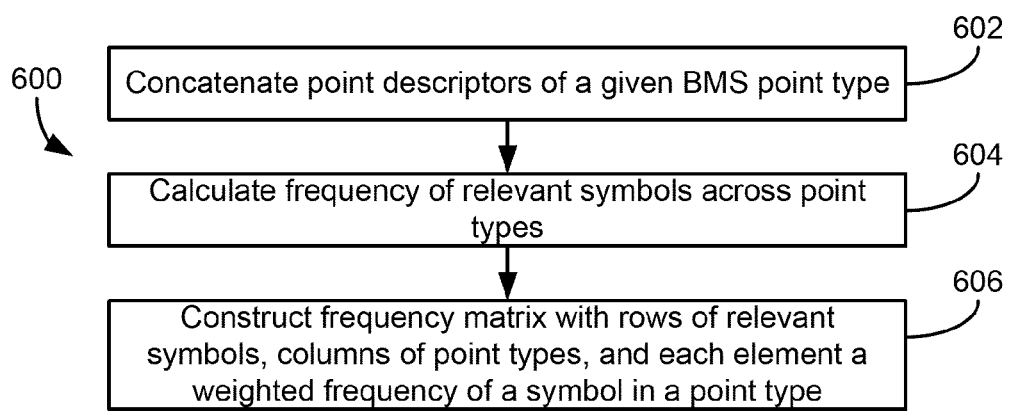
FIG. 6 is a flow diagram of a process for generating a frequency matrix, according to an exemplary embodiment.

Referring now to FIG. 6, a flow diagram of a process 600 for generating a frequency matrix is shown, according to an exemplary embodiment. Process 600 may be implemented on, e.g., processing circuit 140. Process 600 describes step 512 of process 500 (FIG. 5) in more detail. In other embodiments, different methods may be used to generate the frequency matrix. For example, latent semantic indexing may be used.

Process 600 includes concatenating points descriptors of a given point type (602). According to an exemplary embodiment, the manually-labeled point descriptors are grouped by point type. This may be done by semantic categorizer 202 (FIG. 2A, 2B). String concatenator 204 concatenates the point descriptors of a given type into one string. A string of point descriptors $D_{c_j}$ for a j th point type $c_j$ is $$D_{cj} = d_{(cj,1)} \bullet @ \bullet d_{(cj,2)} \bullet @ \ldots @ \bullet d_{(cj,n)},$$

where $d_{(c_j, i)}$ is the ith point descriptor manually assigned to point type $c_j$, • is a string concatenation operator, and @ is a delimiter. Each point type may be associated with one string of point descriptors. Concatenating the strings of a given type may advantageously reduce the size of matrix generated using the strings (as described in step 606). In turn, this may advantageously decrease the size of memory 160 (FIG. 1), which may store data representing the matrix. In other embodiments, point descriptors of a given type may not be concatenated, and the frequency matrix may be generated (as described in step 606) with each element corresponding to the frequency of a symbol, the point descriptor, and the point type.

Process 600 includes calculating the frequency of relevant terms across BMS point types (604). As described in the discussion of term frequency calculator 206 (FIG. 2A) and step 404 of process 400 (FIG. 4), for each relevant symbol and for each concatenated string of point descriptors, the frequency that a relevant symbol appears in a concatenated string is calculated. Frequency calculator 206 (FIG. 2A) may calculate the frequencies. Because the concatenated strings represent point types (as described in step 602), calculating the frequency of the symbols across the concatenated strings is equivalent to calculating the frequency across point types. According to an exemplary embodiment, the calculated frequencies are weighted using an inverted document frequency factor. This is described in the discussion of weighted frequency calculator 208 (FIG. 2A).

Process 600 includes constructing a frequency matrix with the relevant symbols, concatenated strings, and weighted frequencies (604). The frequency matrix may be described as the first matrix. As described in the discussion of matrix generator 210 and step 404 of process 400 (FIG. 4), the frequency matrix is constructed with columns of concatenated descriptions (i.e., each column corresponds to a different concatenated description or a different point type), rows of relevant substrings (i.e., each row corresponds to a different relevant substring), and individual elements of the weighted frequency that each of the relevant substrings appears the concatenated descriptions. Matrix generator 210 may construct the frequency matrix.

Figure 7:
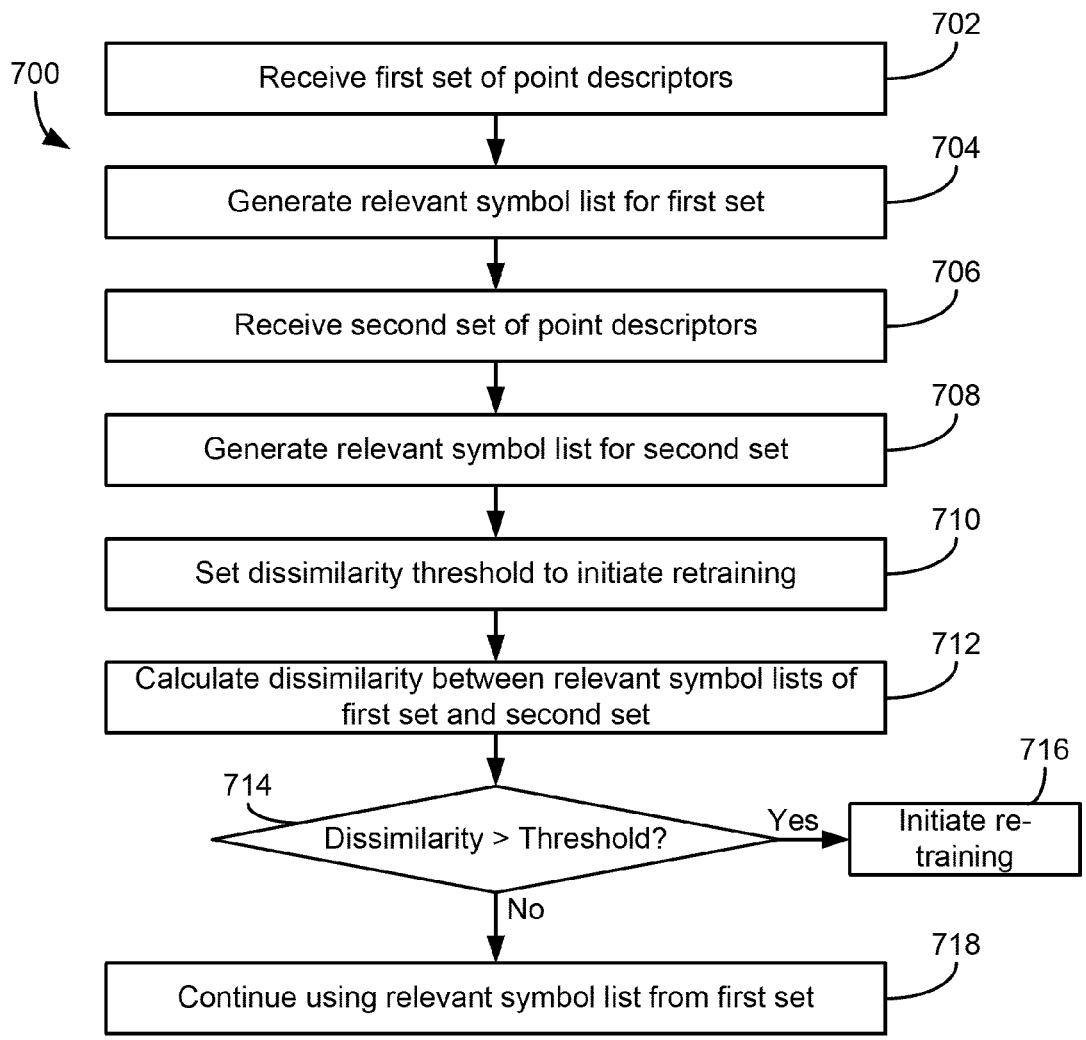
FIG. 7 is a flow diagram of a process for determining whether retraining is required, according to an exemplary embodiment.

Referring now to FIG. 7, a flow diagram of a process 700 for determining whether retraining is required, according to an exemplary embodiment. Process 700 determines whether the relevant symbol list (from step 510 of process 500), frequency matrix (from step 512 of process 500), and probability description (from step 514 of process 500) are sufficiently representative of the points being classified. That is, process 700 determines whether the terms that are used in the points to be classified are similar enough to the terms used to generate the relevant symbol list, frequency matrix, and probability description, such that the points will be classified accurately. If there is too much divergence between the terms used in the current points for classification and the terms used to generate the relevant symbol list, frequency matrix, and probability description, retraining may be initiated. Process 700 may be implemented on, e.g., processing circuit 140. According to an exemplary embodiment, process 700 may be completed prior to probabilistically assigning point types. This may advantageously ensure that point types are assigned by a classifier that is representative of the terms used in the points for classification.

Process 700 includes receiving a first set of point descriptors (702) and a second set of point descriptors (706). The first set and second set may each be pluralities of unclassified data points. The point descriptors (or data points, in some embodiments) may be received from BAS installations 170. Steps 702, 704 are substantially as described in the discussion of step 502 of process 500 (FIG. 5). According to an exemplary embodiment, the second set of point descriptors may be received at some time after the first set of point descriptors is received. During that intervening time, the number and/or content of the point descriptors from BAS installations 170 may have changed. For example, the second set may include additional point descriptors that were not present in the first set. This may be the case when additional BAS installations are brought on line. In another example, the second set may include fewer point descriptors than in the first set. However, the second set may include point descriptors with terms that did not appear in the first set. This may be the case when integrating heterogeneous building automation systems (i.e., those using different point description vocabularies).

Process 700 includes generating relevant symbol lists for the first set (704) and the second set (708) of point descriptors. Steps 704, 708 may be substantially as described in step 510 of process 500 (FIG. 5). Note that steps 702 (receiving the first set) and 704 (generating a relevant symbol list for the first) maybe completed as part the ordinary process for classifying point descriptors of the first set (as described by, e.g., process 400 and process 500). The relevant symbol list generated for the first set may be valid for one or more sets of points for classification. However, once a number and/or content of the points of classification have changed beyond a certain threshold, the relevant symbol list for the first set of point descriptors may no longer be optimal.

Process 700 includes setting a dissimilarity threshold (710). According to an exemplary embodiment, a quantity may be calculated representing the dissimilarity of the relevant symbol list from the first set of point descriptors and the second set of point descriptors. The dissimilarity threshold describe the point at which retraining is initiated. Process 700 includes calculating the dissimilarity between the relevant symbol lists for the first set and second set (712). According to an exemplary embodiment, the dissimilarity is calculated using Jaccard dissimilarity. This is described in the discussion of dissimilarity calculator 302 (FIG. 3). If two lists are identical (i.e., the same terms are used in both sets), then the Jaccard dissimilarity equals one. If the intersection of two sets is empty (i.e., none of the same terms are used in the two sets), then the Jaccard dissimilarity equals zero. The thresholding parameter may be set between zero and one (step 710). A thresholding parameter that is closer to zero allows greater tolerance for differences between the two relevant symbol lists, and retraining occurs less frequently. A thresholding parameter that is closer to one allows less tolerance for differences between the two lists, and retraining occurs more frequently.

Process 700 includes comparing the calculated dissimilarity to the threshold (714). If the calculated dissimilarity is greater than the threshold, then retraining may be initiated (716). The need for retraining may be reported to a user interface generated by GUI services 110. In some embodiments, retraining starts automatically (without a manual input). In other embodiments, the input of a BAS operator is required to start retraining. When the calculated dissimilarity is less than the threshold, the relevant symbol list from the first set may be continued to be used in the classification of points (718).

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied.

Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A computerized method of assigning a building automation system point type to a plurality of unclassified data points of a building automation system, the method comprising:
    receiving, at a processing circuit, the plurality of unclassified data points from one or more subsystems or devices of the building automation system, each of the unclassified data points comprising at least one attribute containing a substring;
    classifying each data point of a first subset of the unclassified data points by associating a building automation system point type of a plurality of building automation system point types with each data point of the first subset, wherein remaining unclassified data points form a second subset;
    generating a term set containing the substrings that appear in the attributes of the first subset of data points;
    calculating, for each substring in the term set, a frequency value indicating a frequency that the substring appears in the attributes of the first subset of data points associated with one of the building automation system point types;
    repeating the calculating for each of the building automation system point types such that a frequency value is calculated for each unique combination of a selected substring and a selected building automation system point type;
    generating a first matrix, each element of the first matrix corresponding to one of the unique combinations and containing the frequency value calculated for the unique combination;
    using the elements of the first matrix to calculate, for each of the unique combinations, an indicator of a probability that the presence of the selected substring in the at least one attribute of a data point results in the data point belonging to the selected building automation system point type;
    assigning a building automation system point type to each data point of the second subset by finding the substring and potential building automation system point type pair having the greatest indication of probability; and
    using the data points of the second subset with the assigned building automation system point types to control one or more subsystems or devices of the building automation system.

2. The method of claim 1, wherein generating the first matrix comprises:
    collecting data points of the first subset classified as the same building automation system point type;
    concatenating the attributes of the data points of the first subset classified as the same building automation system point type;
    calculating, for each of the substrings, the frequency the selected substring appears in the concatenated attributes associated with each building automation system point type; and
    constructing the first matrix with columns of the concatenated attributes, rows of the substrings, and individual elements of the frequency that the selected substring appears the concatenated attributes associated with the selected building automation system point type.

3. The method of claim 2, wherein calculating the indicator of the probability comprises using a naive Bayes classifier.

4. The method of claim 3, wherein generating the first matrix comprises using latent semantic indexing.

5. The method of claim 2, wherein generating the first matrix further comprises weighting the frequency that the selected substring appears in the concatenated attribute associated with the selected building automation system point type using an inverse document frequency factor.

6. The method of claim 2, wherein the indicator of the probability, for each of the substrings and for each of the building automation system point types, is equal to the frequency that the selected substring appears in the concatenated attribute associated with the selected building automation system point type summed over the substrings and the concatenated attributes associated with each building automation system point type, divided by the number of the occurrences of any of the substrings in the concatenated attributes associated with the selected building automation system point type.

7. The method of claim 2, wherein generating the first matrix further comprises:
    deconstructing the first matrix using singular value decomposition into the product of a second matrix, a third matrix, and a fourth matrix;
    constructing a fifth matrix using portions of the second matrix, the third matrix, and the fourth matrix, wherein the portions are defined by a quality control constant, and wherein the fifth matrix is an approximation of the first matrix.

8. The method of claim 7, wherein the indicator of the probability, for each of the substrings and for each of the plurality of building automation system point types, is equal to the cosine distance of a vector describing the selected substring and a vector describing the selected building automation system point type.

9. The method of claim 1, further comprising:
receiving a second plurality of unclassified data points and at least one attribute for each data point;
generating at least one additional term set containing substrings that appear in the attributes of the at least one additional plurality of unclassified data points;
calculating a dissimilarity indicator using the term set and the at least one additional term set; and
generating a new term set containing substrings of the first subset of data points and the second plurality of unclassified data points when the dissimilarity indicator is greater than a threshold amount.

10. The method of claim 9, wherein the dissimilarity indicator comprises a Jaccard index.

11. A system for assigning a building automation system point type to a plurality of unclassified data points of a building automation system, the controller comprising:
a processing circuit configured to receive the plurality of unclassified data points from one or more subsystems or devices of the building automation system, each of the unclassified data points comprising at least one attribute containing a sub string;
wherein the processing circuit is further configured to classify each data point of a first subset of the unclassified data points by associating a building automation system point type of a plurality of building automation system point types with each data point of the first subset, wherein remaining unclassified data points form a second subset;
wherein the processing circuit is further configured to generate a term set containing the substrings that appear in the attributes of the first subset of data points;
wherein the processing circuit is further configured to calculate, for each substring in the term set, a frequency value indicating a frequency that the substring appears in the attributes of the first subset of data points associated with one of the building automation system point types;
wherein the processing circuit is further configured to repeat the calculation for each of the building automation system point types such that a frequency value is calculated for each unique combination of a selected substring and a selected building automation system point type;
wherein the processing circuit is further configured to generate a first matrix, each element of the first matrix corresponding to one of the unique combinations and containing the frequency value calculated for the unique combination;
wherein the processing circuit is further configured to use the elements of the first matrix to calculate, for each of the unique combinations, an indicator of a probability that the presence of the selected substring in the at least one attribute of a data point results in the data point belonging to the selected building automation system point type;
wherein the processing circuit is further configured to assign a building automation system point type to each data point of the second subset by finding the substring and potential building automation system point type pair having the greatest indication of probability; and
wherein the processing circuit is further configured to use the data points of the second subset with the assigned building automation system point types to control one or more subsystems or devices of the building automation system.

12. The system of claim 11, wherein generating the first matrix comprises:
collecting data points of the first subset classified as the same building automation system point type;
concatenating the attributes of the data points of the first subset classified as the same building automation system point type;
calculating, for each of the substrings, the frequency the selected substring appears in the concatenated attributes associated with each building automation system point type; and
constructing the first matrix with columns of the concatenated attributes, rows of the substrings, and individual elements of the frequency that the selected substring appears the concatenated attributes associated with the selected building automation system point type.

13. The system of claim 12, wherein calculating the indicator of the probability comprises using a naive Bayes classifier.

14. The system of claim 13, wherein generating the first matrix comprises using latent semantic indexing.

15. The system of claim 12, wherein generating the first matrix further comprises weighting the frequency that the selected substring appears in the concatenated attribute associated with the selected building automation system point type using an inverse document frequency factor.

16. The system of claim 12, wherein the indicator of the probability, for each of the substrings and for each of the building automation system point types, is equal to the frequency that the selected substring appears in the concatenated attribute associated with the selected building automation system point type summed over the substrings and the concatenated attributes associated with each building automation system point type, divided by the number of the occurrences of any of the substrings in the concatenated attributes associated with the selected building automation system point type.

17. The system of claim 12, wherein generating the first matrix further comprises:
deconstructing the first matrix using singular value decomposition into the product of a second matrix, a third matrix, and a fourth matrix;
constructing a fifth matrix using portions of the second matrix, the third matrix, and the fourth matrix, wherein the portions are defined by a quality control constant, and wherein the fifth matrix is an approximation of the first matrix.

18. The system of claim 17, wherein the indicator of the probability, for each of the substrings and for each of the plurality of building automation system point types, is equal to the cosine distance of a vector describing the selected substring and a vector describing the selected building automation system point type.

19. The system of claim 11, wherein the processing circuit is further configured to:
receive a second plurality of unclassified data points and at least one attribute for each data point;
generate at least one additional term set containing substrings that appear in the attributes of the at least one additional plurality of unclassified data points;

calculate a dissimilarity indicator using the term set and the at least one additional term set; and generate a new term set containing substrings of the first subset of data points and the second plurality of unclassified data points when the dissimilarity indicator is greater than a threshold amount.

20. The system of claim 19, wherein the dissimilarity indicator comprises a Jaccard index.

* * * * *